United States Patent
Ayanam et al.

(10) Patent No.: US 8,918,778 B2
(45) Date of Patent: Dec. 23, 2014

(54) METHOD OF FAIL SAFE FLASHING MANAGEMENT DEVICE AND APPLICATION OF THE SAME

(71) Applicant: American Megatrends, Inc., Norcross, GA (US)

(72) Inventors: Varadachari Sudan Ayanam, Suwanee, GA (US); Baskar Parthiban, Johns Creek, GA (US); Samvinesh Christopher, Suwanee, GA (US); Senguttuvan Marimuthu, Chennai (IN); Venkatesan Balakrishnan, Chennai (IN)

(73) Assignee: American Megatrends, Inc., Norcross, GA (US)

( * ) Notice: Subject to any disclaimer, the term of this patent is extended or adjusted under 35 U.S.C. 154(b) by 85 days.

(21) Appl. No.: 13/864,761

(22) Filed: Apr. 17, 2013

(65) Prior Publication Data
US 2014/0317612 A1    Oct. 23, 2014

(51) Int. Cl.
*G06F 9/44* (2006.01)
*G06F 9/445* (2006.01)

(52) U.S. Cl.
CPC . *G06F 8/665* (2013.01); *G06F 8/65* (2013.01)
USPC ............................. 717/171; 717/170; 717/173

(58) Field of Classification Search
CPC ....................................................... G06F 8/65
USPC ........................................... 717/171, 170, 173
See application file for complete search history.

(56) References Cited

U.S. PATENT DOCUMENTS

| | | | |
|---|---|---|---|
| 6,237,091 B1 * | 5/2001 | Firooz et al. ...................... 713/1 |
| 6,986,008 B2 * | 1/2006 | Colvig et al. .................. 711/162 |
| 8,499,295 B2 * | 7/2013 | Selvam ......................... 717/168 |
| 8,694,984 B2 * | 4/2014 | Chang ........................... 717/169 |
| 2002/0053008 A1 * | 5/2002 | Goodman et al. ............. 711/162 |
| 2003/0097431 A1 * | 5/2003 | Dill ............................... 709/221 |
| 2007/0174686 A1 * | 7/2007 | Douglas et al. ................. 714/13 |
| 2007/0250830 A1 * | 10/2007 | Holmberg et al. ............. 717/171 |
| 2008/0520830 * | 4/2008 | McGhee et al. .................. 714/2 |
| 2012/0072897 A1 * | 3/2012 | Selvam ......................... 717/171 |

* cited by examiner

*Primary Examiner* — Phillip H Nguyen
(74) *Attorney, Agent, or Firm* — Morris Manning & Martin, LLP; Tim Tingkang Xia, Esq.

(57) ABSTRACT

An aspect relates to fail safe flashing techniques for a management device of a computer system. A non-volatile memory of the management device stores a current firmware, an actual critical information and a backup critical information, which is rewritable in a booting mode and read-only in a flash mode. A flasher module is launched to operate the management device in the flash mode. The actual critical information is copied to a volatile memory and erased in the non-volatile memory. A replacement firmware is used to upgrade the current firmware. The actual critical information is mixed and matched with a new critical information. A user input is requested to write the mixed and matched critical information back to the non-volatile memory as the actual critical information. When the user input is not received after a first predetermined time period, the mixed and matched critical information is automatically written back.

21 Claims, 10 Drawing Sheets

METHOD OF FAIL SAFE FLASHING MANAGEMENT DEVICE AND APPLICATION OF THE SAME

FIELD

The present disclosure relates to the field of management devices for computer systems, and particularly to fail safe flashing techniques for a management device such as a baseboard management controller (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "service processor" (SP) or a "baseboard management controller" (BMC) refer to a specialized microcontroller that manages the interface between system management software and platform hardware. The BMC can be embedded on the motherboard of a computer, generally a server. For example, different types of sensors can be built into the computer system, and the BMC reads these sensors to obtain parameters such as temperature, cooling fan speeds, power status, operating system (OS) status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again.

Generally, the BMC may include a non-volatile memory, such as a flash memory, for storing the BMC firmware. Contents stored in the BMC memory chip can be rewritten without removing it from the motherboard, allowing the BMC firmware software to be upgraded in place. The rewriting process of the BMC firmware is generally referred to as flashing the BMC. In a client-server system, the BMC on a host computer may be flashed remotely from a client. However, when flashing the BMC remotely from a client, the flashing procedure is driven by the client side. If, for any reason, the client fails in the process of flashing the BMC, the BMC will lose its critical information, including the configuration information of the BMC.

Therefore, a heretofore unaddressed need still exists in the art to address the aforementioned deficiencies and inadequacies.

SUMMARY

In one aspect, the present disclosure relates to a method of fail safe flashing a management device of a computer system. The management device includes a volatile memory and a non-volatile memory, and the non-volatile memory stores a current firmware and an actual critical information. In certain embodiments, the method includes: launching a flasher module to operate the management device in a flash mode; copying the actual critical information from the non-volatile memory to the volatile memory, and erasing the actual critical information stored in the non-volatile memory; upgrading the current firmware by a replacement firmware received from a remote computing device; mixing and matching the actual critical information with a new critical information; requesting a user input to write the mixed and matched critical information back to the non-volatile memory as the actual critical information; writing the mixed and matched critical information back to the non-volatile memory as the actual critical information when the user input is not received after a first predetermined time period; and restarting the management device in a booting mode.

In certain embodiments, the management device is a baseboard management controller (BMC).

In certain embodiments, the method further includes: receiving, from the remote computing device, version information of the replacement firmware via the network; comparing the version information of the replacement firmware to a version information of the current firmware in the non-volatile memory; validating the replacement firmware, and upgrading the current firmware by the replacement firmware when the version information of the replacement firmware is different from the version information of the current firmware, or when an instruction is received from the remote computing device to override the current firmware within a second predetermined time period; and aborting the upgrading when no instruction from the remote computing device is received within the second predetermined time period.

In certain embodiments, the non-volatile memory is a flash memory. In certain embodiments, the flash memory further stores a backup critical information, and the backup critical information is read-only in the flash mode and rewritable in the booting mode.

In certain embodiments, the step of booting the management device includes: validating the backup critical information; validating the actual critical information if the backup critical information is invalid, and copying the actual critical information to the backup critical information if the actual critical information is valid; and comparing the backup critical information to the actual critical information if the backup critical information is valid, and copying the backup critical information to the actual critical information if the backup critical information is different from the actual critical information.

In certain embodiments, the flash memory is partitioned to at least two partitions. In certain embodiments, the actual critical information and the current firmware are respectively stored in the at least two partitions, and the partition storing the actual critical information includes a first validity flag sector indicating validity of the actual critical information.

In certain embodiments, the flash memory is divided to a plurality of memory technology device (MTD) blocks, and a file system is mounted on the blocks of the flash memory.

In certain embodiments, the method further includes: unmounting the file system from the flash memory after copying the actual critical information to the volatile memory and erasing the actual critical information stored in the flash memory; and mounting the file system to the flash memory before writing the mixed and matched critical information back to the flash memory.

Another aspect of the present disclosure relates to a method of fail safe flashing a management device of a computer system. The management device includes a volatile memory and a non-volatile memory. The non-volatile memory stores a current firmware, an actual critical information and a backup critical information, and the backup critical information is rewritable in a booting mode and read-only in a flash mode. The method includes: launching a flasher module to operate the management device in the flash mode; copying the actual critical information from the non-volatile memory to the volatile memory, and erasing the actual critical information stored in the non-volatile memory; upgrading the current firmware by a replacement firmware received from a remote computing device; mixing and matching the actual critical information with a new critical information; writing the mixed and matched critical information back to the non-volatile memory as the actual critical information; and restarting the management device in the booting mode, and replacing the actual critical information with the backup information in response to a determination of the backup critical information being valid and being different from the actual critical information.

In certain embodiments, the step of replacing the actual critical information with the backup information includes: validating the backup critical information; comparing the backup critical information to the actual critical information when the backup critical information is valid, replacing the actual critical information with the backup information when the backup critical information is different from the actual critical information; and validating the actual critical information when the backup critical information is invalid, and replacing the backup critical information with the actual critical information when the actual critical information is valid.

In certain embodiments, the step of upgrading the current firmware includes: receiving, from the remote computing device, the replacement firmware via a network, and storing the replacement firmware to the volatile memory; validating the replacement firmware; copying a part of the current firmware to the volatile memory; comparing the part of the current firmware in the volatile memory to a corresponding part of the replacement firmware in the volatile memory; and writing the corresponding part of the replacement firmware to the non-volatile memory to replace the part of the current firmware when the part of the current firmware is different from the corresponding part of the replacement firmware, or when an instruction is received from the remote computing device to override the part of the current firmware.

In certain embodiments, the method further includes: receiving, from the remote computing device, version information of the replacement firmware via the network; comparing the version information of the replacement firmware to a version information of the current firmware in the non-volatile memory; and upgrading the current firmware by the replacement firmware when the version information of the replacement firmware is different from the version information of the current firmware, or when an instruction is received from the remote computing device to override the current firmware.

In certain embodiments, the non-volatile memory is a flash memory, and the flash memory is partitioned to at least two partitions, wherein the current firmware is stored in one of the at least two partitions, and the actual critical information and the backup critical information are stored in the other of the at least two partitions.

In certain embodiments, the partition storing the actual critical information and the backup critical information includes a first validity flag sector indicating validity of the actual critical information and a second validity flag sector indicating validity of the backup critical information.

In certain embodiments, the flash memory is divided to a plurality of memory technology device (MTD) blocks, and a file system is mounted on the blocks of the flash memory.

In certain embodiments, the method further includes: unmounting the file system from the flash memory after copying the actual critical information to the volatile memory and erasing the actual critical information stored in the flash memory; and mounting the file system to the flash memory before writing the mixed and matched critical information back to the flash memory.

In yet another aspect, a method of fail safe flashing a management device of a computer system is disclosed. The management device includes a volatile memory and a non-volatile memory. The non-volatile memory stores a current firmware, an actual critical information and a backup critical information, and the backup critical information is rewritable in a booting mode and read-only in a flash mode. The method includes: launching a flasher module to operate the management device in the flash mode; copying the actual critical information from the non-volatile memory to the volatile memory, and erasing the actual critical information stored in the non-volatile memory; upgrading the current firmware by a replacement firmware received from a remote computing device; mixing and matching the actual critical information with a new critical information; requesting a user input to write the mixed and matched critical information back to the non-volatile memory as the actual critical information; writing the mixed and matched critical information back to the non-volatile memory as the actual critical information when the user input is not received after a first predetermined time period; and restarting the management device in the booting mode, and replacing the actual critical information with the backup information in response to a determination of the backup critical information being valid and being different from the actual critical information.

In certain embodiments, the step of replacing the actual critical information with the backup information includes: validating the backup critical information; comparing the backup critical information to the actual critical information when the backup critical information is valid, replacing the actual critical information with the backup information when the backup critical information is different from the actual critical information; and validating the actual critical information when the backup critical information is invalid, and replacing the backup critical information with the actual critical information when the actual critical information is valid.

In certain embodiments, the step of upgrading the current firmware includes: receiving, from the remote computing device, the replacement firmware via a network, and storing the replacement firmware to the volatile memory; validating the replacement firmware; copying a part of the current firmware to the volatile memory; comparing the part of the current firmware in the volatile memory to a corresponding part of the replacement firmware in the volatile memory; writing the corresponding part of the replacement firmware to the non-volatile memory to replace the part of the current firmware when the part of the current firmware is different from the corresponding part of the replacement firmware, or when an instruction is received from the remote computing device to override the part of the current firmware within a second predetermined time period; and skipping the part of the current firmware when no instruction from the remote computing device is received within the second predetermined time period.

In certain embodiments, the method further includes: receiving, from the remote computing device, version information of the replacement firmware via the network; comparing the version information of the replacement firmware to a version information of the current firmware in the non-volatile memory; upgrading the current firmware by the replacement firmware when the version information of the replacement firmware is different from the version information of the current firmware, or when an instruction is received from the remote computing device to override the current firmware within a third predetermined time period;

and aborting the upgrading when no instruction from the remote computing device is received within the third predetermined time period.

In certain embodiments, the non-volatile memory is a flash memory, and the flash memory is partitioned to at least two partitions. The current firmware is stored in one of the at least two partitions, and the actual critical information and the backup critical information are stored in the other of the at least two partitions. In certain embodiments, the partition storing the actual critical information and the backup critical information includes a first validity flag sector indicating validity of the actual critical information and a second validity flag sector indicating validity of the backup critical information.

In certain embodiments, the flash memory is divided to a plurality of memory technology device (MTD) blocks, and a file system is mounted on the blocks of the flash memory.

In certain embodiments, the method further includes: unmounting the file system from the flash memory after copying the actual critical information to the volatile memory and erasing the actual critical information stored in the flash memory; and mounting the file system to the flash memory before writing the mixed and matched critical information back to the flash memory.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
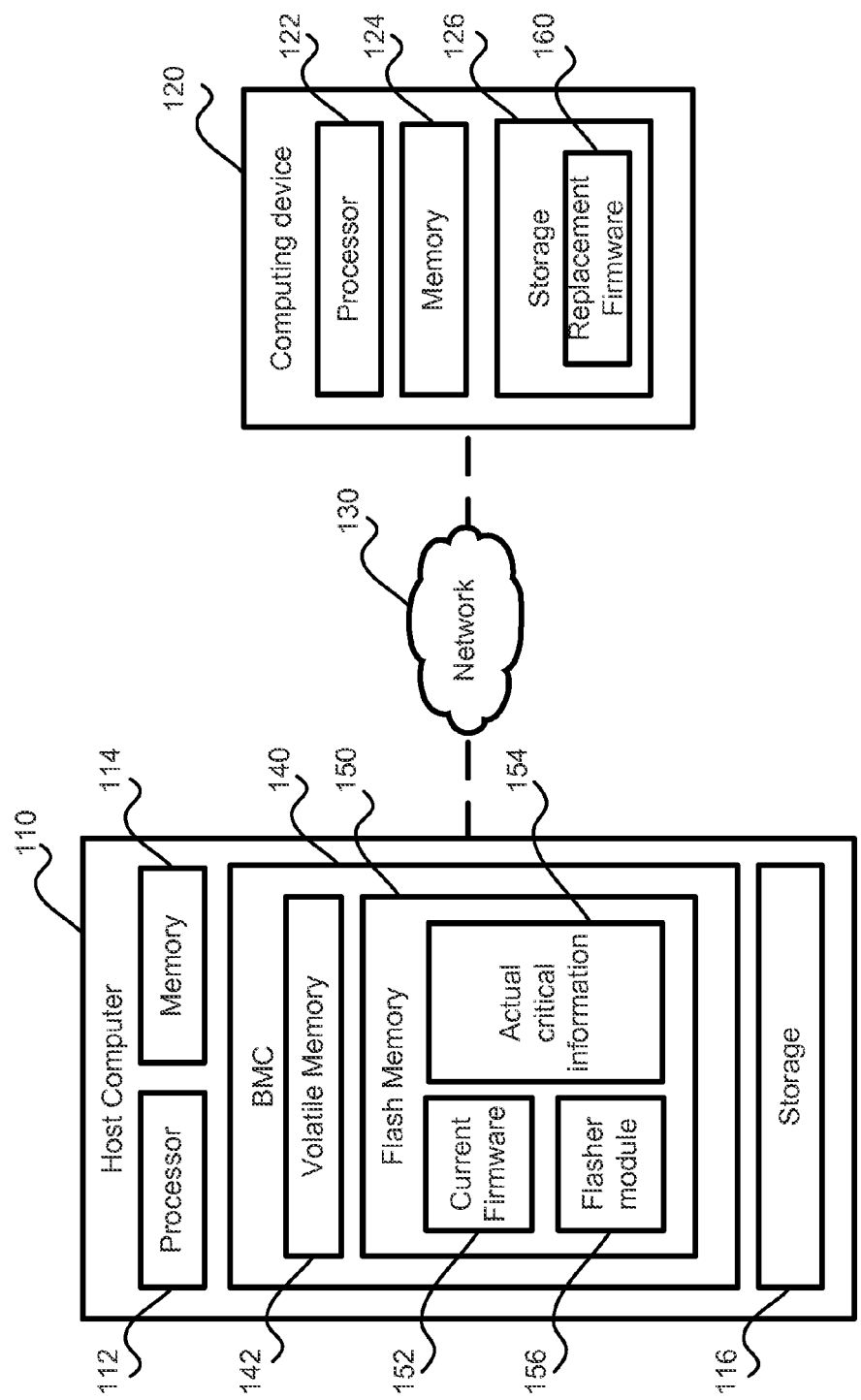
FIG. 1 schematically depicts a computer system according to one embodiment of the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "headless system" or "headless machine" generally refers to the a computer system or machine that has been configured to operate without a monitor (the missing "head"), keyboard, and mouse.

As used herein, the term "memory" generally refers to the physical devices used to store programs (sequences of instructions) or data (e.g. program state information) on a temporary or permanent basis for use in a computer or other digital electronic device. The terms "non-volatile memory" or "nonvolatile memory" refer to computer memory that can retain the stored information even when not powered, and the term "volatile memory" refers to computer memory that requires power to maintain the stored information.

As used herein, the term "communication" generally refers to communication through physical or non-physical connections between computer components or devices with or without intermediate communicating devices, links, interface or other intercommunicating media. Communication can be generally performed by, but not limited to, non-physical signals such as electronic, magnetic, optical or other types of signals.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "module" generally refers to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The methods described herein may be implemented by one or more computer programs executed by one or more processors of a computer system. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a computer system according to one embodiment of the present disclosure. As shown in FIG. 1, the computer system 100 includes a host computer 110 and a computing device 120 connected to the host computer 110 via a network 130. The system 100 can be a system that incorporates more than one interconnected system, such as a client-server network. The network 130 may be a wired or wireless network, and may be of various forms such as a local area network (LAN) or wide area network (WAN) including the Internet.

The host computer 110 may be a general purpose computer system. The host computer 110 includes a baseboard (not shown), or the "motherboard", which is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard include a processor 112, a memory 114, and other required memory and Input/Output (I/O) devices or modules. The processor 112, the memory 114, and the BMC 140 may be embedded on the baseboard, or may be connected to the baseboard through an interface. In certain embodiments, the interface may be physical hardware interface such as electrical connectors, buses, ports, cables, terminals, or other I/O devices.

The processor 112 is a host processor, such as a central processing unit (CPU), which is configured to control operation of the host computer 110. The processor 112 can execute an operating system (OS) or other applications of the host computer 110. In some embodiments, one of ordinary skill in the art would appreciate that the baseboard may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the host computer 110. Further, the host computer 110 includes a storage 116, which is a data storage media for storing the OS (not shown) and other applications of the host computer 110. Examples of the storage 116 may include flash memory, memory cards, USB drives, hard drives, floppy disks, optical drives, or any other types of data storage devices.

The host computer 110 is in communication with a baseboard management controller (BMC) 140. The BMC 140 can be a general purpose computer system, a special purpose computer system, or a system that incorporates more than one interconnected system, such as a client-server network. In general, the BMC 140 monitors operation, performance, and health-related aspects associated with the host computer 110, such as the temperature of one or more components of the host computer 110, speed of rotational components (e.g., spindle motor, CPU Fan, etc.) within the host computer 110, the voltage across or applied to one or more components within the host computer 110, and the available or used capacity of memory devices within the host computer 110. Different types of sensors can be built into the host computer 110, and the BMC 140 reads these sensors to obtain parameters such as temperature, cooling fan speeds, power status, OS status, etc. The BMC 140 monitors the sensors and can send alerts to a system administrator via the network if any of the parameters do not stay within preset limits, indicating a potential failure of the host computer 110. The administrator can also remotely communicate with the BMC 140 to take some corrective action such as resetting or power cycling the system to get a hung OS running again.

In certain embodiments, firmware of the BMC 140 adheres to the Intelligent Platform Management Interface (IPMI) industry standard for system monitoring and event recovery. The IPMI protocol is a standardized computer system interface protocol for out-of-band management of computer systems and monitoring of the operation, which is session-based, requiring an IPMI session be established between the application module and the target IPMI device before the application module can communicate with the target IPMI device. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. The BMC 140 can receive IPMI instructions or requests from a locally connected management computer through a system interface, or as external requests through a network interface. Additional details regarding IPMI can be found in the IPMI Specification (Version 2.0), which is publicly available from INTEL CORPORATION, and which is incorporated herein by reference.

In certain embodiments, the BMC 140 includes a volatile memory 142 and a non-volatile memory 150. The volatile memory 142 is configured to store the data and information during the operation of the BMC 140. The non-volatile memory 150 can be a flash memory and is configured to store code and data required for the operation of the BMC 140. In certain embodiments, the flash memory 150 stores, among other things, a current firmware 152, an actual critical information 154, and a flasher module 156.

The current firmware 152 includes the necessary program codes and data for the operation of the BMC 140, such as a Linux kernel for booting the BMC 140, and other necessary monitoring and sensing programs. For convenience, the firmware 152 currently stored in the flash memory 150 is referred to as "current."

The actual critical information 154 includes the essential information that enables the BMC 140 to operate correctly. In certain embodiments, the critical information may include the media access control (MAC) address of the BMC 140, kernel boot parameters, environment variables and other customer specific files. In particular, the MAC address provides internet protocol (IP) information available for the BMC 140, which allows network connectivity and network support of the BMC 140 to perform remote management. The kernel boot parameters and the environment variables allow the BMC 140 to properly run the Linux kernel and other monitoring and sensing programs of the current firmware 152. Examples of the environment variables include platform details, field replaceable unit (FRU) information and other configuration information based on which sensor porting and platform management programs and codes would be launched. If the critical information is lost, the BMC 140 may lose its operational functionality.

As will be described in detail below, the flasher module 156 is a program module which runs during the flashing process of the BMC 140 for receiving instructions and performing functions to flash the flash memory 150.

The computing device 120 can be a local computer or mobile device serving as the client device of the system 100 and can receive user interactions. As shown in FIG. 1, the computing device 120 is remotely connected to the host computer 110 via the network 130, and includes a baseboard (not shown) with a processor 122 and a memory 124. The computing device 120 can operate independently without being connected to the host computer 110. Examples of the computing device 120 may include traditional computer systems such as desktop computers and servers as well as portable devices such as smartphones, tablets and other mobile computer devices.

As shown in FIG. 1, the computing device 120 includes a storage 126. The storage 126 is a data storage media for storing the OS (not shown) and other applications of the computing device 140. Examples of the storage 126 of the computing device 140 may include flash memory, memory cards, USB drives, hard drives, floppy disks, optical drive, or any other types of data storage devices. In this exemplary embodiment, the storage 126 stores a replacement firmware 160, which can be an upgraded version of the current firmware 152 stored in the flash memory 150 of the BMC 140. In certain embodiments, the replacement firmware 160 may include or be associated with new critical information, such as new kernel boot parameters and other configuration information related to the replacement firmware 160. Thus, a user may use the computing device 120 to remotely connect to the host computer 110 to flash the BMC 140, i.e. to upgrade the current firmware 152 stored in the flash memory 150 to the replacement firmware 160.

As described above, the BMC 140 stores the firmware 152 and the critical information (including the actual critical information 154 and the backup critical information 156) in the flash memory 150. Typically, the flash memory 150 stores information in an array of memory cells made from floating-gate transistors, which is different in its nature from other volatile or non-volatile memory because the information or data stored therein must be erased before new data can be written to the memory cells. There are two main types of flash memory: the NAND type and the NOR type, which are respectively named after the NAND and NOR logic gates. The flash memory 150 is divided into in blocks. Each block can vary in size, where the most common is 128 KB. In the majority of NAND flash devices each block is made of 64 pages of 2 KB each. A page is divided in two regions: the data area, and the spare area used for memory management purposes. Pages are divided in sector units (or chunks) of 512 byte to emulate the popular sector size (ibid). The block is the smallest erasable unit while the page is the smallest programmable unit.

In certain embodiments, the flash memory 150 can be divided into one or more sections of memory called partitions. Each partition represents one contiguous area of the flash memory 150. When the flash memory 150 includes multiple partitions, a system processor may read from one partition while completing a writing/erasing procedure in another partition. This permits cutting code and programming data in the same flash memory 150.

Figure 2:
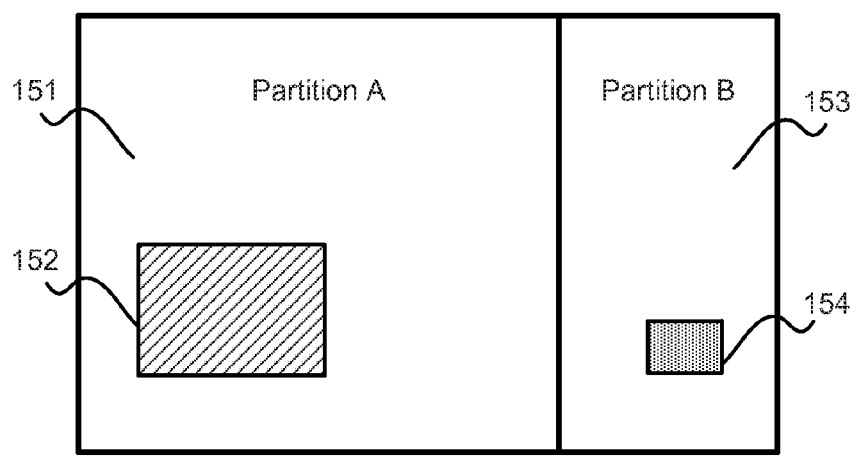
FIG. 2 schematically depicts the partitions of a flash memory according to one embodiment of the present disclosure.

FIG. 2 schematically depicts the partitions of the flash memory of the BMC 140 according to one embodiment of the present disclosure. It should be appreciated that the figures show the partitions in the block form solely for the illustration purposes, and the actual partitions of the flash memory may be different. As shown in FIG. 2, the flash memory 150 includes at least two partitions 151 and 153, which are hereinafter referred to as partitions A and B. The partition A stores the current firmware 152. The partition B stores the actual critical information 154. Size of the partitions A and B may vary. In certain embodiments, the partition B is a smaller partition, and the memory size of the partition B is enough to store a master file of the partition and the critical information.

Figure 3:
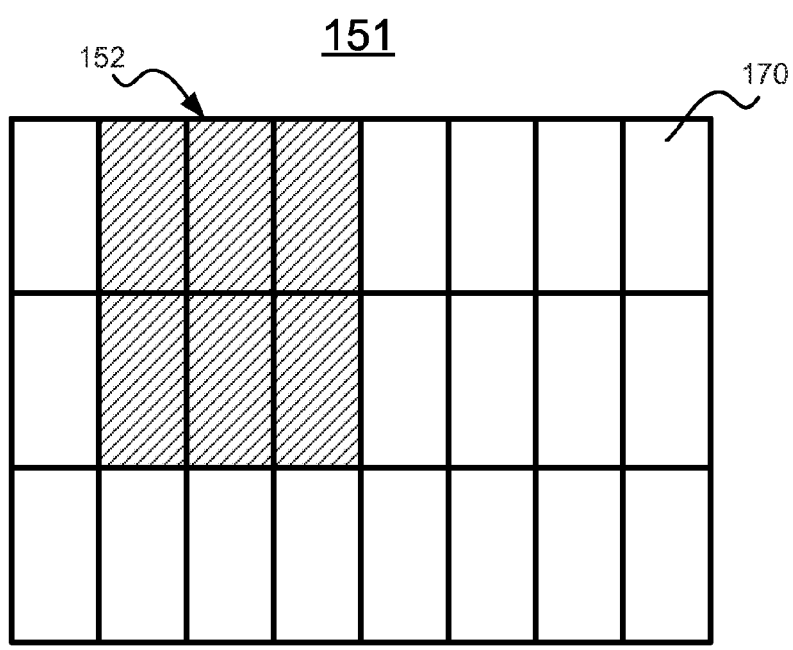
FIG. 3 schematically depicts the blocks of the partition A storing the BMC firmware according to one embodiment of the present disclosure.

FIG. 3 schematically depicts the partition A storing the firmware according to one embodiment of the present disclosure. The flasher module 156 or the firmware utilizes a flash driver (or flash translation layer) to read and write data to the flash memory 150. Under a Linux system, the executed flasher module 156 or the firmware 152 generally access the flash memory 150 through the memory technology device (MTD) subsystem. The executed flasher module 156 or firmware 152 can mount a file system on top the MTD subsystem. The file system can manage both partitions A and B. The flash driver or the MTD subsystem operates a block as the smallest erasable unit. In certain embodiments, a block can have a size of 128K (=131072) bytes. In an erasing or rewriting operation, data in one block must be erased before new data can be rewritten to any sector of the block. When a file system is mounted on top of the MTD subsystem, the file system uses sectors (not shown in FIG. 3A) as the basic memory units. The size of a sector is generally 512 or 1024 bytes. A block contains a number of sectors. Data can be written into one or more sectors of a block. Examples of the file system include ext2, ext3, XFS, JFS, FAT, or any other suitable file systems.

In certain embodiments, the current firmware 152 is stored in a number of blocks in the partition A. It should be appreciated that the figure show the blocks in the matrix form solely for the illustration purposes, and the actual memory allocation of the blocks of the flash memory may be different.

In certain embodiments, the actual critical information 154 is stored in a number of blocks in the partition B. In certain embodiments, the critical information relates to the kernel boot parameters, the environment variables, or other customer specific files. In certain embodiments, a master file 182, which can indicates the validity of the critical information, is also stored in the partition B.

When flashing the BMC remotely from a client, the flashing procedure typically is driven by the client side. Without the techniques described below, when the client fails in the process of flashing the BMC, the BMC may lose its critical information. In certain embodiments, the flasher module 156 can initiate a timer for every operation or selected operations initiated by the client. If the client has not sent further instructions when the timer expires, the flasher module 156 of the BMC 140 then takes over the control and completes the flashing process. Thus, the flashing process would not stop or halt due to the failure of the client, and the BMC would not lose the critical information.

Figure 4A:
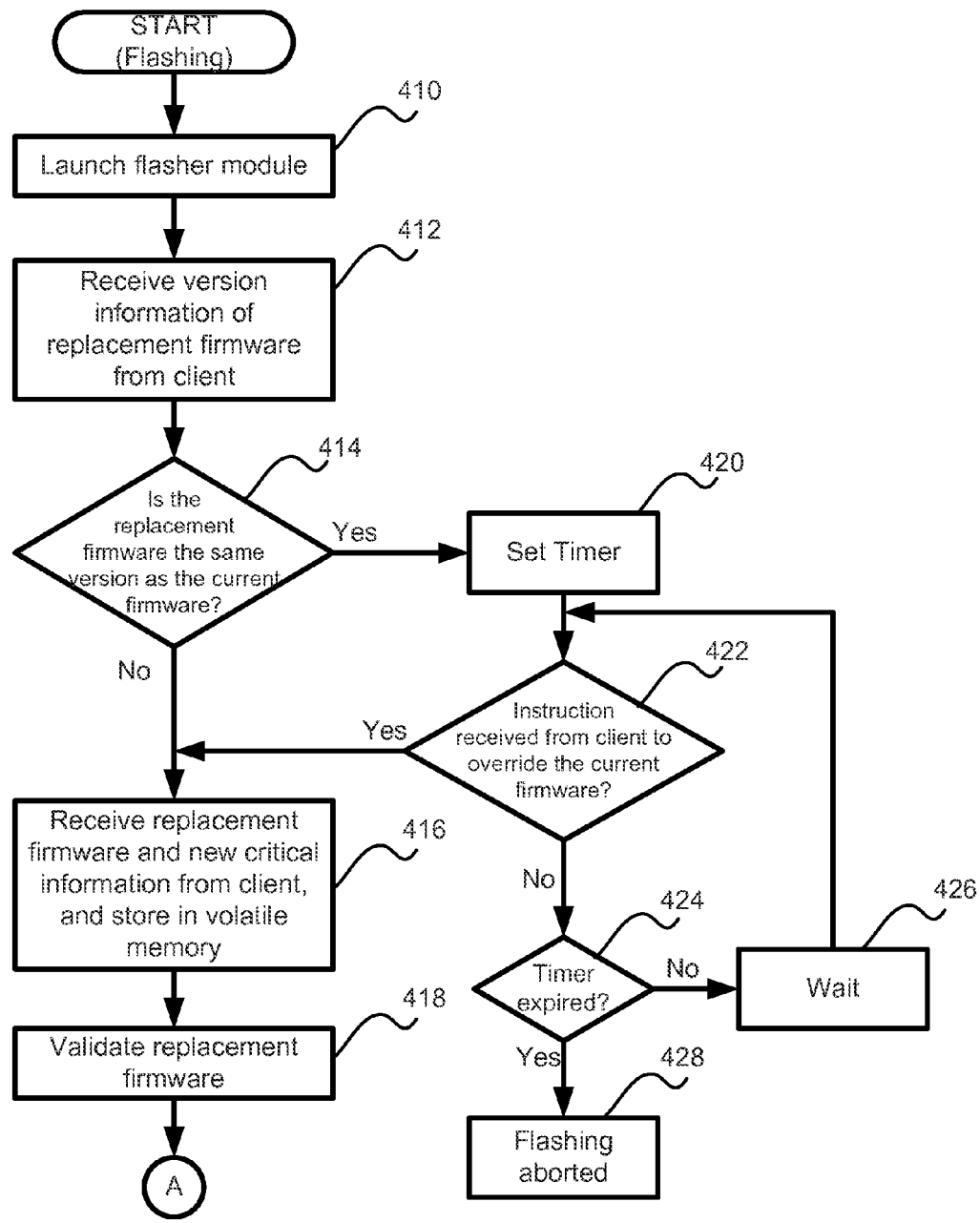
FIGS. 4A and 4B schematically depicts a flowchart of flashing the BMC according to one embodiment of the present disclosure.
Figure 4B:
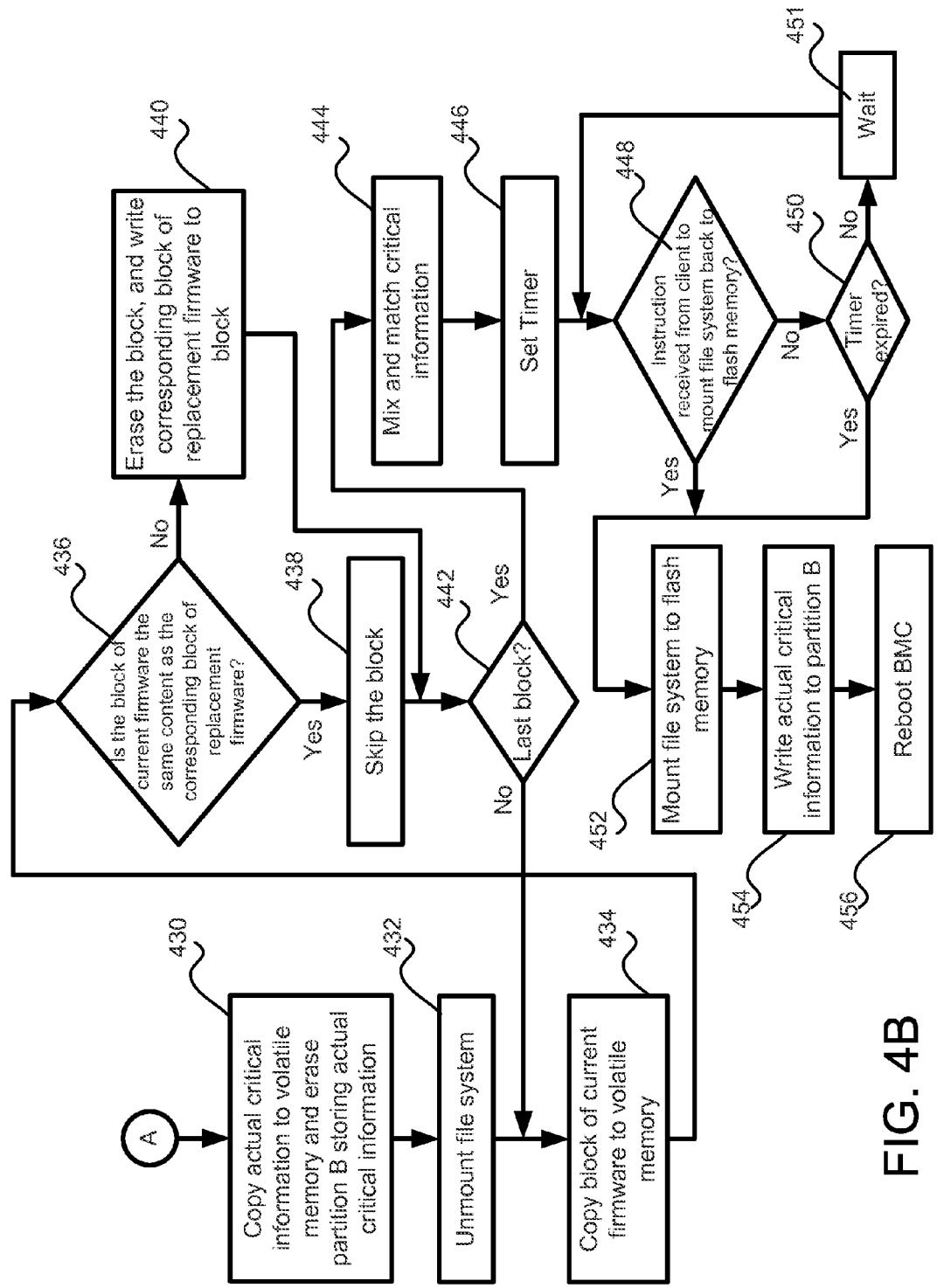

FIGS. 4A and 4B schematically depicts a flowchart of flashing the BMC according to certain embodiments of the present disclosure, As shown in FIG. 4A, when the flashing process starts, the BMC is operated or restarted in the flash mode. At operation 410, the BMC 140 launches the flasher module 156 in the volatile memory 142 to control the flashing process at the host computer 110 side. At operation 412, the BMC receives version information of the replacement firmware 160 from the client (the computing device 120), where the user is in control of the flashing process. At operation 414, the flasher module 156 then compares the version of the replacement firmware to the current firmware. The comparison determines whether the replacement firmware 160 is in the same version as the current firmware 152.

If the replacement firmware 160 is a different version from the current firmware 152, e.g., a newer version, the flasher module 156 enters operation 416. If the version of the replacement firmware 160 is the same as the current firmware 152, at operation 420, the flasher module 156 sets a timer T because the procedures may require confirmation of the user from the computing device 120 side. For example, the timer T can be set to a predetermined time period, such as 30 seconds, or any other desired time period. At operation 422, the flasher module 156 checks if the user at the client side (the computing device 120) sends an instruction to override the current firmware even if the version is the same. If such instruction is received, the flasher module 156 enters operation 416.

On the other hand, if no such instruction is received, at operation 424, the flasher module 156 checks if the timer expires. If the timer has not expired, at operation 426, the flasher module 156 waits for a predetermined time period (e.g., 0.5 second) and goes back to operation 422. If the timer expires and the flasher module 156 receives no instruction to override the current firmware 152, or if the flasher module 156 receives an instruction not to override the current firmware 152, at operation 428, the flashing process is aborted.

At operation 416, the flasher module 156 notifies the computing device 120 to transmit the replacement firmware 160 and, if any, the corresponding new critical information. The flasher module 156 receives the replacement firmware 160 and the corresponding new critical information and stores the received files to the volatile memory 142 of the BMC 140. At operation 418, the flasher module 156 validates the received replacement firmware files for checksum and integrity.

As shown in FIG. 4B, when the replacement firmware 160 is successfully transmitted and stored in the volatile memory 142, at operation 430, the flasher module 156 copies the actual critical information 154 from the critical information partition B of the flash memory 150 to the volatile memory 142, and erases the actual critical information 154 stored in the partition B. This procedure is performed before other procedures of the flashing process because the flashing process is generally operated directly using the flash driver or the MTD subsystem. Then, at operation 432, the flasher module 156 unmounts the file system of the flash memory 150. The flash module 156 can operate directly on the blocks 170 using the flash driver or the MTD subsystem.

After the file system is unmounted, the flasher module 156 starts the procedures to upgrade the current firmware 152. At operation 434, the flasher module 156 copies a part (e.g., one block) of the current firmware 152 stored in blocks 170 to the volatile memory 142. At operation 436, the flasher module 156 compares one block of the current firmware 152 with a corresponding block of the replacement firmware 160 to determine whether the two blocks are the same (e.g., include the same content). If the two blocks are different, the flasher module 156 enters operation 440. If the two blocks are the same, the flasher module 156 enters operation 438. At operation 440, the flasher module 156 erases the corresponding block 170 in the flash memory, and writes the corresponding block of the replacement firmware to the erased block 170. At operation 438, the flasher module 156 skips the block 170. In other words, the corresponding block 170 of the current firmware 152 stored in the flash memory is not changed.

After comparing a block of current firmware with the replacement firmware, at operation 442, the flasher module 156 checks if that just compared block 170 is the last block of the current firmware 152. If there are other blocks waiting to be operated, the flasher module 156 goes back to operate on the next block 170. In this way, the flasher module 156 processes through all the blocks 170 of the flash memory 150.

When the flasher module 156 has operated on all the blocks 170 of the current firmware, at operation 444, the flasher module 156 can then, when necessary or desired, mix and match the new critical information received form the computing device 120 with the critical information copied from the flash memory 150. For example, the flasher module 156 can check each data in the actual critical information in the volatile memory 142, and determine whether those data should be replaced by the new critical information data. Further, the flasher module 156 can add data from the new critical information to the actual critical information in the volatile memory 142, remove data from the actual critical information, or completely discard the actual critical information and only use the new critical information data. Thus, the mixed and matched critical information in the volatile memory 142 becomes the new actual critical information 154, which corresponds to the replacement firmware 160 and allows the BMC 140 to operate properly after flashing.

After mixing and matching the critical information, the flasher module 156 waits for user interaction in order to proceed to the next operations including writing the new actual critical information to the partition B 153. Specifically, at operation 446, the flasher module 156 sets a timer. For example, the timer can be set to a predetermined time period, such as 60 seconds, or any other desired time period. At operation 448, the flasher module 156 checks if the user inputs the instruction at the client side (the computing device 120) to mount the file system back to the flash memory 150. If the instruction is received, the flasher module 156 enters operation 452. If no such instruction is received, at operation 450, the flasher module 156 checks if the timer expires. If the timer has not expired, at operation 451, the flasher module 156 waits for a predetermined time period (e.g., 1 second) and then goes back to operation 448, until the timer expires to automatically enter operation 452.

At operation 452, the flasher module 156 mounts the file system on top of the flash driver or MTD subsystem of the flash memory 150. Then, at operation 454, the flasher module 156 writes the mixed and matched (i.e., new) actual critical information 154 to the partition B 153 of the flash memory 150.

As disclosed in FIGS. 4A and 4B, when the flasher module 156 requires a confirmation instruction from the user, the flasher module 156 sets a timer and wait for the instruction from the user. When the timer expires, if the flasher module 156 does not receive an expected user interaction from the client side, the flasher module 156 can proceed to a predetermined operation as illustrated above. It should be appreciated that the above procedure may be modified to require additional user interactions. Further, wherever a user interaction is required, the flasher module 156 may use the timer mechanism to proceed to a predetermined operation if the client side fails to provide an expected interaction.

Figure 5:
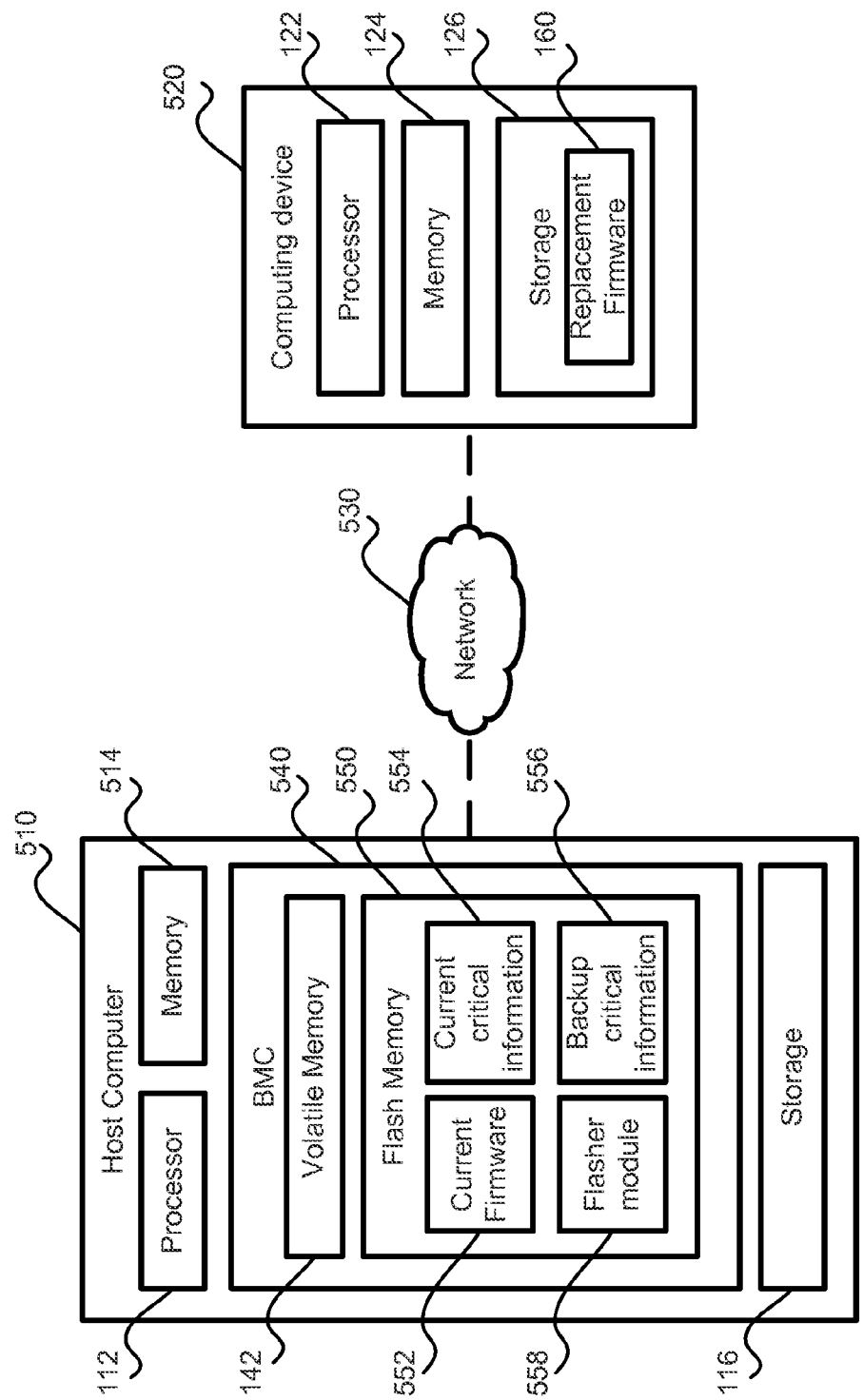
FIG. 5 schematically depicts a computer system according to one embodiment of the present disclosure.

FIG. 5 schematically depicts a computer system according to another embodiment of the present disclosure. As shown in FIG. 5, the computer system 500 includes a host computer 510 and a computing device 520 connected to the host computer 510 via a network 530. Comparing with the system 100 as shown in FIG. 1, the system 500 has a flash memory 550 that stores, among other things, a current firmware 552, an actual critical information 554, a flasher module 556, and a backup critical information 558. The actual critical information 554 and the backup critical information 558 are two copies of critical information, which includes the essential information that enables the BMC 140 to operate correctly and will be explained in detail below.

Figure 6:
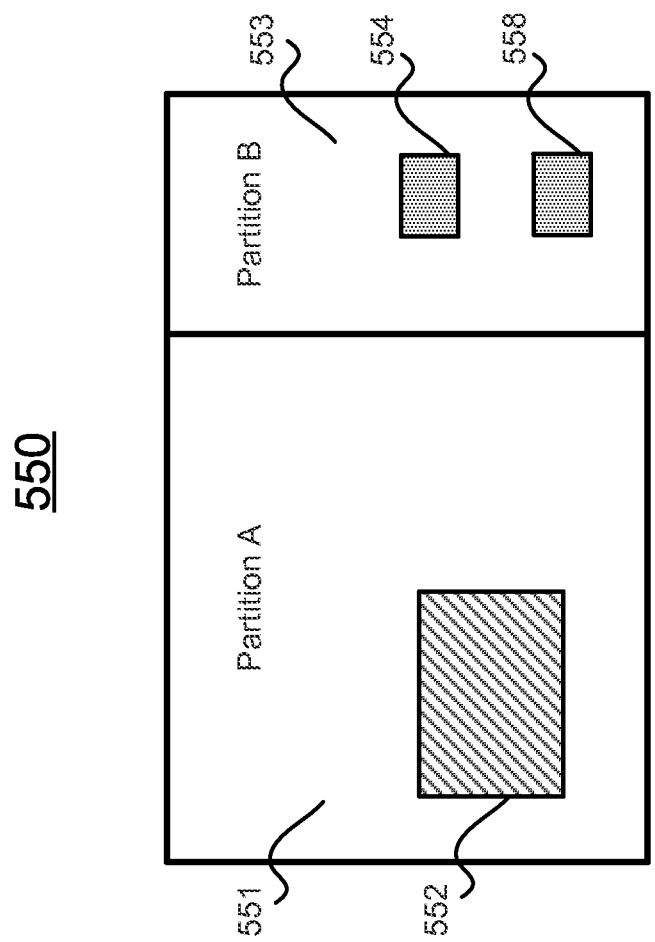
FIG. 6 schematically depicts the partitions of a flash memory according to one embodiment of the present disclosure.

FIG. 6 schematically depicts the partitions of the flash memory of the BMC according to one embodiment of the present disclosure. It should be appreciated that the figures show the partitions in the block form solely for the illustration purposes, and the actual partitions of the flash memory may be different. As shown in FIG. 6, the flash memory 550 includes at least two partitions 551 and 553, which are hereinafter referred to as partitions A and B. The partition A stores the current firmware 552. The partition B stores the actual critical information 554 and the backup critical information 558. Size of the partitions A and B may vary. In certain embodiments, the partition B is a smaller partition, and the memory size of the partition B is enough to store a master file of the partition and the critical information.

Figure 7B:
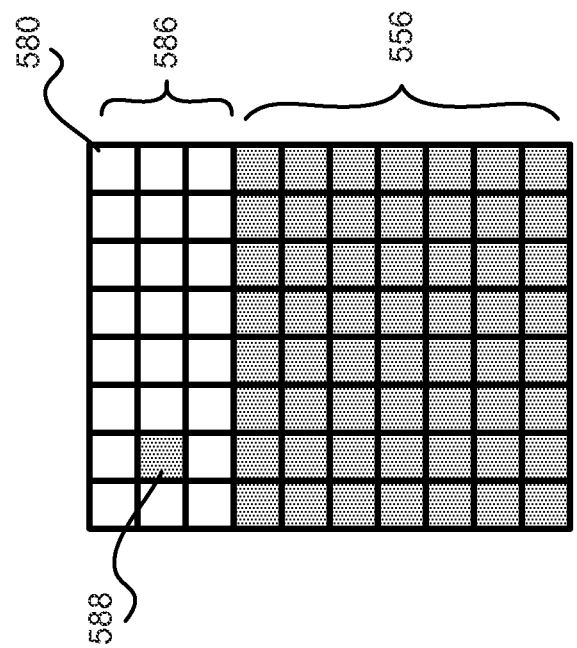
FIG. 7B schematically depicts a block of the partition B storing the backup critical information according to one embodiment of the present disclosure.
Figure 7A:
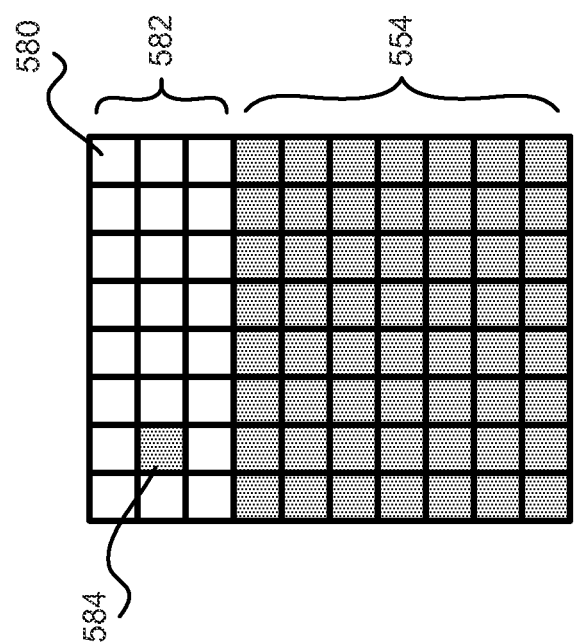
FIG. 7A schematically depicts a block of the partition B storing the actual critical information according to one embodiment of the present disclosure.

FIGS. 7A and 7B schematically depict blocks of the partition B storing the actual critical information and the backup critical information according to certain embodiments of the present disclosure. In certain embodiments, each block is divided into a plurality of sectors 580. As shown in FIG. 7A, the block stores the actual critical information 554 and a master file 582. The master file 582 indicates the file allocation of the actual critical information 554. In certain embodiments, the critical information relates to the kernel boot parameters or other customer specific files that should be replaced by the new critical information data, or to the environment variables and other customer specific files. The master file 582 includes a validity flag 584, which may be a file occupying at least one sector of the master file 582, to indicate the validity of the actual critical information 554. By setting the flag value of the validity flag sector 584 as valid or invalid, the validity of the actual critical information 554 may be determined.

Similarly, as shown in FIG. 7B, the block stores the backup critical information 558 and a master file 586. The master file 586 indicates the file allocation of the backup critical information 558. The master file 586 includes a validity flag 588, which may be a file occupying at least one sector of the master file 586, to indicate the validity of the backup critical information 558. By setting the flag value of the validity flag sector 588 as valid or invalid, the validity of the backup critical information 558 may be determined.

In certain embodiments, during the general operation of BMC, the actual critical information 554 contains valid critical information, and the operation of BMC may have access of the actual critical information 554 or write information to the actual critical information 554. Thus, the validity flag 584 of the actual critical information 554 is set to be valid. The value of the validity flag 588 of the backup critical information is set as valid whenever backup of the critical information is performed.

The backup critical information 558 is the backup copy of the same critical information of the actual critical information 554. Thus, to ensure the backup critical information 558 to remain unchanged during the flashing process, one aspect of the disclosure is to set the sectors of the backup critical information 558 as read-only during the flashing process and as rewritable sectors during the regular BMC booting process. Specifically, the backup critical information 558 is read-only when the BMC 540 is in a flash mode, and is rewritable when the BMC 140 is in a normal mode. Thus, during the flashing process, the backup critical information 558 will not be changed by the flasher module 556. If errors occur such that the actual critical information 554 is corrupted, the backup critical information 558 may be used in further BMC booting process to restore essential configuration information of the critical information.

There are various ways to make the backup critical information 558 as read-only during the flashing process. In certain embodiments, the flasher module 556 utilizes programmatic control to mark the sectors of the partition B storing the backup critical information 558 as protected. For example, the current firmware 552 can include a firmware module header (FMH) for each of the modules. By a type indicated by the FMH, the flasher module 556 can determine whether that module is protected. The flasher module 556 can be programmed to skip the sectors marked as protected during the flashing process.

Figure 8A:
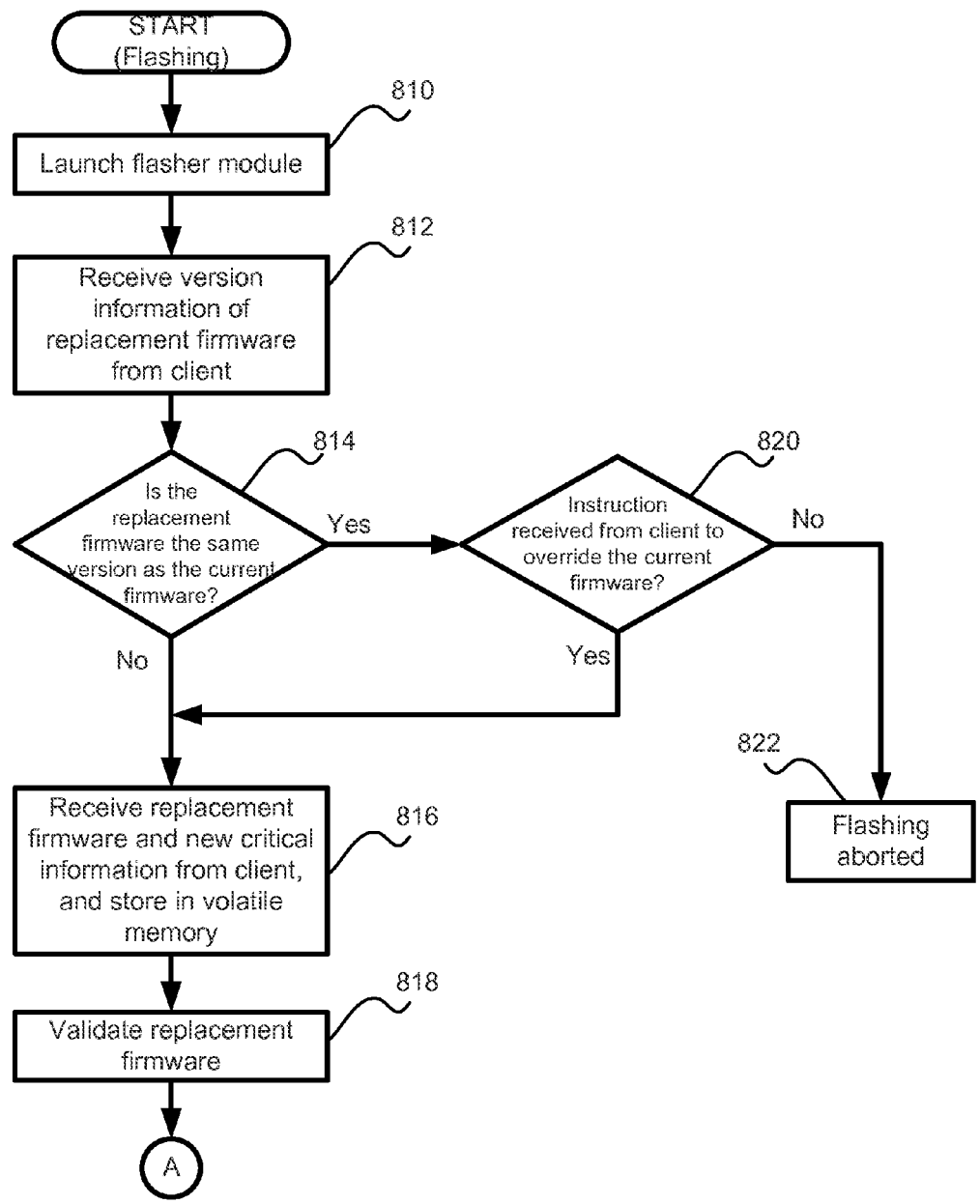
FIGS. 8A and 8B schematically depicts a flowchart of flashing the BMC according to one embodiment of the present disclosure.
Figure 8B:
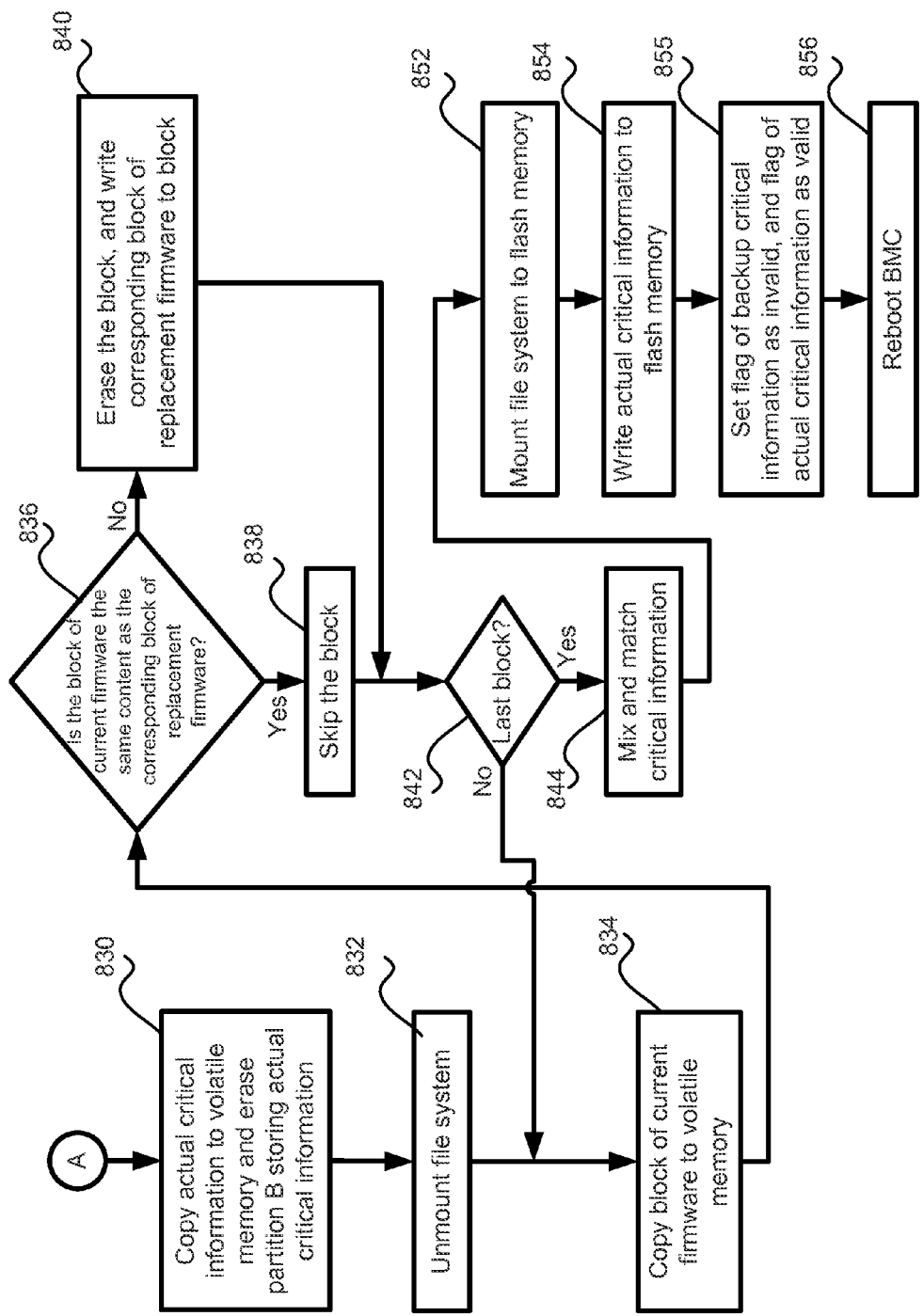

FIGS. 8A and 8B schematically depicts a flowchart of flashing the BMC according to one embodiment of the present disclosure. Specifically, FIG. 8A shows a similar process to the process as shown in FIG. 4A. Optionally, as will be described below, before the flashing process starts, the BMC may be rebooted to ensure the backup critical information 558 is the same as the actual critical information 554. As shown in FIG. 8A, the operations 810 to 818 are the same as the operations 410 to 418 as shown in FIG. 4A, and are therefore not repeated.

At operation 820, if the version of the replacement firmware 560 is the same as the current firmware 552, without setting a timer, the flasher module 556 checks if the user at the client side (the computing device 120) sends an instruction to override the current firmware even if the version is the same. If such instruction is received, the flasher module 556 enters operation 816. On the other hand, if the flasher module 556 receives an instruction not to override the current firmware 552, at operation 822, the flashing process is aborted.

FIG. 8B shows a similar process to the process as shown in FIG. 4B. At operation 830, which is similar to operation 430, the flasher module 556 copies the actual critical information 154 from the critical information partition B of the flash memory 150 to the volatile memory 142, and erases the actual critical information 554 stored in the partition B. This procedure is performed before other procedures of the flashing process because the flashing process is generally operated directly under the MTD subsystem. It should be appreciated that during the flashing process, the block storing the backup critical information 558 is protected as read-only. Thus, the backup critical information 558 is not erased. Then, the flasher module 556 enters operation 832 to start the procedures to upgrade the current firmware 552. The operations 832 to 844 are the same as the operation 432 to 444 as shown in FIG. 4A, and are therefore not repeated.

After operation 844, where the current and new critical information is mixed and matched to become the new actual critical information 554, at operation 852, the flasher module 556 mounts the file system on top of the flash driver or MTD subsystem of the flash memory 550. Then, at operation 854, the flasher module 556 writes the mixed and matched (i.e., new) actual critical information 554 to the partition B 553 of the flash memory 550.

Upon successfully writing the actual critical information 554 to the partition B, the new actual critical information 554 becomes valid, and the backup critical information 558, which includes old critical information before flashing, becomes invalid. Thus, at operation 855, the flasher module 556 sets the flag value of the validity flag sector 584 of the actual critical information 554 as valid, and the flag value of the validity flag sector 588 of the backup critical information 558 as invalid. Thus, the flashing process is complete, and at operation 856, the flasher module 556 reboots the BMC 540, or restarts the BMC 540 in the booting mode.

On the other hand, if the actual critical information 554 is not successfully written to the partition B for any reasons, the flag values of the validity flag sector 584 of the actual critical information 554 and the validity flag sector 588 of the actual critical information 554 would not be changed. In other words, the flag value of the validity flag sector 584 would remain invalid, and if a previous backup process has set the validity flag sector 588 as valid, the flag value of the validity flag sector 588 would remain valid.

Figure 9:
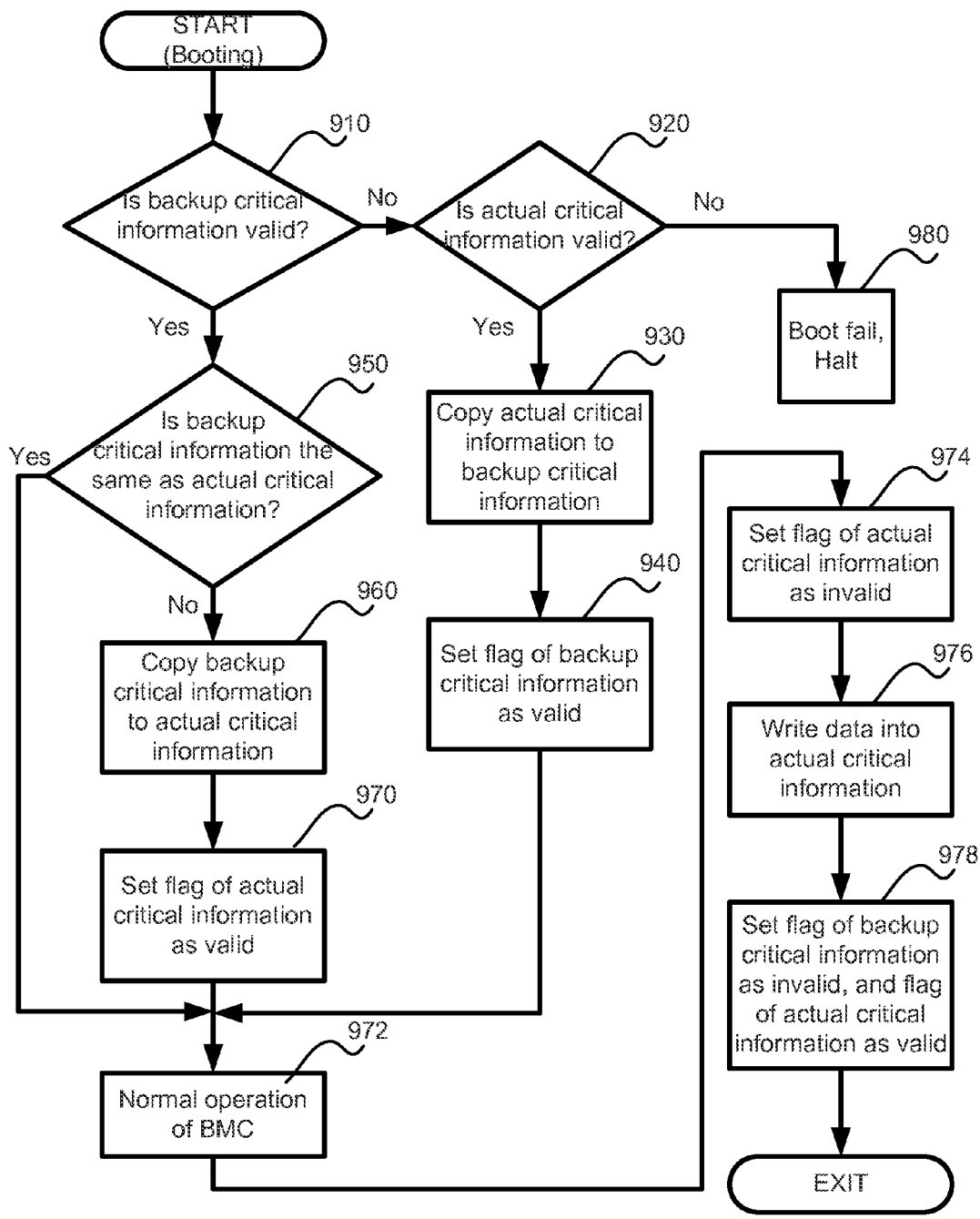
FIG. 9 schematically depicts a flowchart of booting the BMC according to one embodiment of the present disclosure.

FIG. 9 schematically depicts a flowchart of booting the BMC according to one embodiment of the present disclosure. As shown in FIG. 9, when the BMC 540 boots, at operation 910, the BMC 540 checks the validity flag sector 588 as to whether the backup critical information 558 is valid. As described above, when the flashing process is complete and the actual critical information 554 is successfully written to the partition B, the flag value of the validity flag sector 588 would be invalid. In this case, at operation 920, the BMC 540 checks the validity flag sector 584 as to whether the actual critical information 554 is valid, and obtains a confirmative result. Thus, at operation 930, the BMC 540 copies the actual critical information 554 to the partition B storing the backup critical information 558 to replace the old data of the backup critical information 558. Then, at operation 940, the BMC 540 sets the flag value of the validity flag sector 588 of the backup critical information 558 as valid. Thus, both the actual critical information 554 and the backup critical information 558 would include valid new information data obtained in the flashing process. After operation 940, the BMC 540 enters operation 972 to perform normal operation.

On the other hand, if the actual critical information 554 is not successfully written to the partition B during the flashing process for any reasons, the flag value of the validity flag sector 588 would remain valid. In this case, at operation 950, the BMC 540 would compare the backup critical information 558 to the actual critical information 554 to determine whether the backup critical information 558 is the same as the actual critical information 554. Since the actual critical information 554 has been erased in the flashing process and was not successfully written to the same partition B, the partition B would contain corrupted information data, and the backup critical information 558 would be different from the actual critical information 554. Thus, the BMC 540 copies the backup critical information 558 to the partition B storing the actual critical information 554 to replace the corrupted information data. Then, at operation 970, the BMC 540 sets the flag value of the validity flag sector 584 of the actual critical information 554 as valid. Thus, both the actual critical information 554 and the backup critical information 558 would include the old critical information data, which does not correspond to the upgraded replacement firmware in the flash memory 550, and may require further flashing to upgrade the critical information to the newest version. However, certain essential configuration information in the old critical information data would not be lost, thus allowing the BMC 540 to operate in limited capacity or to perform further flashing operations. After operation 970, the BMC 540 enters operation 972 to perform normal operation.

In the normal operation of BMC 540, the user may change certain data or information of the actual critical information 554. To change the actual critical information 554, at operation 974, the BMC 540 sets the validity flag 584 of the actual critical information 554 as invalid. At operation 976, the BMC 540 writes new data into the actual critical information 554. After updating the actual critical information 554, at operation 978, the BMC 540 sets the validity flag 588 of the backup critical information 558 as invalid, and the validity flag 584 of the actual critical information 554 as valid. The BMC 540 may then require subsequent reboot to update the backup critical information 558. In certain embodiments, the user may set up the BMC 540 to periodically reboot in order to keep the backup critical information 558 up to date.

It should be noted that the backup critical information 558 would only be changed in the booting or rebooting process of the BMC 540 immediately after the actual critical information 554 is changed in the flashing process or in the normal operation. Thus, when the actual critical information 554 does not change, a regular booting process of the BMC 540 would not cause the backup critical information 558 to change. Specifically, when the BMC 540 boots, at operation 910, the BMC 540 checks the validity flag sector 588 as to whether the backup critical information 558 is valid, and receives a confirmative result. Then, at operation 950, the BMC 540 would compare the backup critical information 558 to the actual critical information 554 to determine whether the backup critical information 558 is the same as the actual critical information 554. Since the backup critical information 558 includes the same critical information as the actual critical information 554, nothing would be done to the actual critical information 554 and the backup critical information 558 during the regular booting process.

The backup critical information 558 is useful to prevent from failure in the flashing process. If there is no valid backup critical information 558 stored in the partition B, once the actual critical information 554 is not successfully written to the partition B during the flashing process for any reasons, the BMC 540 would lose its critical information, and booting would fail. Specifically, at procedures 910 and 940, none of the actual critical information 554 and the backup critical information 558 would be valid. Thus, at operation 980, the booting process of the BMC 540 would fail, and the system is halted.

It should be appreciated that the methods as described in the different embodiments may be combined. For example, in certain embodiments, the system 100 as shown in FIG. 1 may include, in the partition B storing the actual critical information 154, a validity flag for the actual critical information, and a block for storing backup critical information. In certain embodiments, in the flashing process as shown in FIGS. 8A and 8B, the flasher module 556 may set timers for user input.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present disclosure is defined by the appended claims rather than the foregoing description and the exemplary embodiments described therein.

What is claimed is:

1. A method of fail safe flashing a management device of a computer system, the management device comprising a volatile memory and a non-volatile memory, wherein the non-volatile memory is a flash memory, and wherein the non-volatile memory stores a current firmware, a backup critical information, and an actual critical information, the method comprising:

launching a flasher module to operate the management device in a flash mode;

copying the actual critical information from the non-volatile memory to the volatile memory, and erasing the actual critical information stored in the non-volatile memory;

upgrading the current firmware by a replacement firmware received from a remote computing device;

mixing and matching the actual critical information with a new critical information;

requesting a user input to write the mixed and matched critical information back to the non-volatile memory as the actual critical information;

writing the mixed and matched critical information back to the non-volatile memory as the actual critical information when the user input is not received after a first predetermined time period; and restarting the management device in a booting mode, wherein the backup critical information is read-only in the flash mode and rewritable in the booting mode; and wherein the step of restarting the management device in a booting mode comprises:

validating the backup critical information;

validating the actual critical information if the backup critical information is invalid, and copying the actual critical information to the backup critical information if the actual critical information is valid; and comparing the backup critical information to the actual critical information if the backup critical information is valid, and copying the backup critical information to the actual critical information if the backup critical information is different from the actual critical information.

2. The method as claimed in claim 1, wherein the management device is a baseboard management controller (BMC).

3. The method as claimed in claim 1, further comprising:

receiving, from the remote computing device, version information of the replacement firmware via the network;

comparing the version information of the replacement firmware to a version information of the current firmware in the non-volatile memory;

validating the replacement firmware, and upgrading the current firmware by the replacement firmware when the version information of the replacement firmware is different from the version information of the current firmware, or when an instruction is received from the remote computing device to override the current firmware within a second predetermined time period; and aborting the upgrading when no instruction from the remote computing device is received within the second predetermined time period.

4. The method as claimed in claim 1, wherein the flash memory is partitioned to at least two partitions, wherein the actual critical information and the current firmware are respectively stored in the at least two partitions, and the partition storing the actual critical information includes a first validity flag sector indicating validity of the actual critical information.

5. The method as claimed in claim 1, wherein the flash memory is divided to a plurality of memory technology device (MTD) blocks, and a file system is mounted on the blocks of the flash memory.

6. The method as claimed in claim 5, further comprising:

unmounting the file system from the flash memory after copying the actual critical information to the volatile memory and erasing the actual critical information stored in the flash memory; and mounting the file system to the flash memory before writing the mixed and matched critical information back to the flash memory.

7. A method of fail safe flashing a management device of a computer system, the management device comprising a volatile memory and a non-volatile memory, wherein the non-volatile memory stores a current firmware, an actual critical information and a backup critical information, wherein the backup critical information is rewritable in a booting mode and read-only in a flash mode, the method comprising:

launching a flasher module to operate the management device in the flash mode;

copying the actual critical information from the non-volatile memory to the volatile memory, and erasing the actual critical information stored in the non-volatile memory;

upgrading the current firmware by a replacement firmware received from a remote computing device;

mixing and matching the actual critical information with a new critical information;

writing the mixed and matched critical information back to the non-volatile memory as the actual critical information; and restarting the management device in the booting mode, and replacing the actual critical information with the backup information in response to a determination of the backup critical information being valid and being different from the actual critical information, wherein the step of replacing the actual critical information with the backup information comprises:

validating the backup critical information;

comparing the backup critical information to the actual critical information when the backup critical information is valid, replacing the actual critical information with the backup information when the backup critical information is different from the actual critical information; and validating the actual critical information when the backup critical information is invalid, and replacing the backup critical information with the actual critical information when the actual critical information is valid.

8. The method as claimed in claim 7, wherein the step of upgrading the current firmware comprises:

receiving, from the remote computing device, the replacement firmware via a network, and storing the replacement firmware to the volatile memory;

validating the replacement firmware;

copying a part of the current firmware to the volatile memory;

comparing the part of the current firmware in the volatile memory to a corresponding part of the replacement firmware in the volatile memory; and writing the corresponding part of the replacement firmware to the non-volatile memory to replace the part of the current firmware when the part of the current firmware is different from the corresponding part of the replacement firmware, or when an instruction is received from the remote computing device to override the part of the current firmware.

9. The method as claimed in claim 7, wherein the management device is a baseboard management controller (BMC).

10. The method as claimed in claim 7, further comprising:
receiving, from the remote computing device, version information of the replacement firmware via the network;
comparing the version information of the replacement firmware to a version information of the current firmware in the non-volatile memory; and
upgrading the current firmware by the replacement firmware when the version information of the replacement firmware is different from the version information of the current firmware, or when an instruction is received from the remote computing device to override the current firmware.

11. The method as claimed in claim 7, wherein the non-volatile memory is a flash memory, and the flash memory is partitioned to at least two partitions, wherein the current firmware is stored in one of the at least two partitions, and the actual critical information and the backup critical information are stored in the other of the at least two partitions.

12. The method as claimed in claim 11, wherein the partition storing the actual critical information and the backup critical information includes a first validity flag sector indicating validity of the actual critical information and a second validity flag sector indicating validity of the backup critical information.

13. The method as claimed in claim 7, wherein the flash memory is divided to a plurality of memory technology device (MTD) blocks, and a file system is mounted on the blocks of the flash memory.

14. The method as claimed in claim 13, further comprising:
unmounting the file system from the flash memory after copying the actual critical information to the volatile memory and erasing the actual critical information stored in the flash memory; and
mounting the file system to the flash memory before writing the mixed and matched critical information back to the flash memory.

15. A method of fail safe flashing a management device of a computer system, the management device comprising a volatile memory and a non-volatile memory, wherein the non-volatile memory stores a current firmware, an actual critical information and a backup critical information, wherein the backup critical information is rewritable in a booting mode and read-only in a flash mode, the method comprising:
launching a flasher module to operate the management device in the flash mode;
copying the actual critical information from the non-volatile memory to the volatile memory, and erasing the actual critical information stored in the non-volatile memory;
upgrading the current firmware by a replacement firmware received from a remote computing device;
mixing and matching the actual critical information with a new critical information;
requesting a user input to write the mixed and matched critical information back to the non-volatile memory as the actual critical information;
writing the mixed and matched critical information back to the non-volatile memory as the actual critical information when the user input is not received after a first predetermined time period; and
restarting the management device in the booting mode, and replacing the actual critical information with the backup information in response to a determination of the backup critical information being valid and being different from the actual critical information,
wherein the step of replacing the actual critical information with the backup information comprises:
validating the backup critical information;
comparing the backup critical information to the actual critical information when the backup critical information is valid, replacing the actual critical information with the backup information when the backup critical information is different from the actual critical information; and
validating the actual critical information when the backup critical information is invalid, and replacing the backup critical information with the actual critical information when the actual critical information is valid.

16. The method as claimed in claim 15, wherein the step of upgrading the current firmware comprises:
receiving, from the remote computing device, the replacement firmware via a network, and storing the replacement firmware to the volatile memory;
validating the replacement firmware;
copying a part of the current firmware to the volatile memory;
comparing the part of the current firmware in the volatile memory to a corresponding part of the replacement firmware in the volatile memory;
writing the corresponding part of the replacement firmware to the non-volatile memory to replace the part of the current firmware when the part of the current firmware is different from the corresponding part of the replacement firmware, or when an instruction is received from the remote computing device to override the part of the current firmware within a second predetermined time period; and
skipping the part of the current firmware when no instruction from the remote computing device is received within the second predetermined time period.

17. The method as claimed in claim 15, wherein the management device is a baseboard management controller (BMC).

18. The method as claimed in claim 15, further comprising:
receiving, from the remote computing device, version information of the replacement firmware via the network;
comparing the version information of the replacement firmware to a version information of the current firmware in the non-volatile memory;
upgrading the current firmware by the replacement firmware when the version information of the replacement firmware is different from the version information of the current firmware, or when an instruction is received from the remote computing device to override the current firmware within a third predetermined time period; and
aborting the upgrading when no instruction from the remote computing device is received within the third predetermined time period.

19. The method as claimed in claim 15,
wherein the non-volatile memory is a flash memory, and the flash memory is partitioned to at least two partitions, wherein the current firmware is stored in one of the at least two partitions, and the actual critical information and the backup critical information are stored in the other of the at least two partitions; and wherein the partition storing the actual critical information and the backup critical information includes a first validity flag sector indicating validity of the actual critical information and a second validity flag sector indicating validity of the backup critical information.

20. The method as claimed in claim 15, wherein the flash memory is divided to a plurality of memory technology device (MTD) blocks, and a file system is mounted on the blocks of the flash memory.

21. The method as claimed in claim 20, further comprising:

unmounting the file system from the flash memory after copying the actual critical information to the volatile memory and erasing the actual critical information stored in the flash memory; and mounting the file system to the flash memory before writing the mixed and matched critical information back to the flash memory.

* * * * *